United States Patent
Addink et al.

(10) Patent No.: US 7,096,094 B2
(45) Date of Patent: Aug. 22, 2006

(54) AUTOMATIC IRRIGATION FREQUENCY ADJUSTMENT FOR DEEP WATERING

(76) Inventors: John Addink, Aqua Conservation Systems, Inc., 2900 Adams, Suite A25, Riverside, CA (US) 92504; Kirk Buhler, Aqua Conservation Systems, Inc., 2900 Adams, Suite A25, Riverside, CA (US) 92504

( * ) Notice: Subject to any disclaimer, the term of this patent is extended or adjusted under 35 U.S.C. 154(b) by 359 days.

(21) Appl. No.: 10/344,013

(22) PCT Filed: Apr. 18, 2001

(86) PCT No.: PCT/US01/12784

§ 371 (c)(1),
(2), (4) Date: Apr. 25, 2003

(87) PCT Pub. No.: WO02/086644

PCT Pub. Date: Oct. 31, 2002

(65) Prior Publication Data

US 2003/0208306 A1 Nov. 6, 2003

(51) Int. Cl.
*G05B 11/00* (2006.01)
*A01G 27/00* (2006.01)
(52) U.S. Cl. ............... 700/284; 137/78.2; 239/69
(58) Field of Classification Search ........... 700/284, 700/14, 16, 19, 28, 33; 239/67–69, 99; 137/1, 137/78.2, 78.3, 78.5
See application file for complete search history.

(56) References Cited

U.S. PATENT DOCUMENTS

| | | | | |
|---|---|---|---|---|
| 5,023,787 A | * | 6/1991 | Evelyn-Veere | 700/284 |
| 5,025,361 A | * | 6/1991 | Pitman et al. | 700/14 |
| 5,229,937 A | | 7/1993 | Eveyln-Veere | 700/284 |
| 5,251,153 A | * | 10/1993 | Nielsen et al. | 700/284 |
| 5,272,620 A | * | 12/1993 | Mock et al. | 700/16 |
| 5,444,611 A | * | 8/1995 | Woytowitz et al. | 700/16 |
| 5,479,339 A | | 12/1995 | Miller | 700/16 |
| 5,539,637 A | * | 7/1996 | Upchurch et al. | 700/284 |
| 5,696,671 A | * | 12/1997 | Oliver | 700/284 |
| 5,839,660 A | * | 11/1998 | Morgenstern et al. | 239/63 |
| 6,102,061 A | * | 8/2000 | Addink | 137/1 |
| 7,010,394 B1 | * | 3/2006 | Runge et al. | 700/284 |

* cited by examiner

*Primary Examiner*—Paul Rodriguez
(74) *Attorney, Agent, or Firm*—Rutan & Tucker, LLP

(57) ABSTRACT

The present invention provides systems and methods in which a microprocessor (220) is programmed to calculate an accumulated watering need for an irrigation zone of station (400)and control irrigation to the zone or station (400) using an automatically varied cycle amount that falls between a user controllable maximum threshold and a user controllable minimum threshold. The cycle amount is preferably at least partly derived from ETo data. The minimum threshold may vary during a period of 12 consecutive months, may vary as a function of time of year, as a function of crop maturity or as a function of any other suitable factor where it would be advantageous to set a minimum threshold. The cycle amount may equal the accumulated ETo value(s) or may equal the maximum threshold value. Furthermore, the microprocessor (220) may be programmed to control the irrigation to the zone or station (400) using an automatically varied day schedule.

13 Claims, 8 Drawing Sheets

Appl. No. 10/344,013
Amdt. Dated Dec. 8, 2003
Reply to Office Action of Oct. 31, 2003
Replacement Sheet

| Irrigation System | Irrigation Frequency | Irrigation Triggering Mechanism | Quantity of Water Applied During Each Application |
|---|---|---|---|
| 1. Standard system | Fixed | Next scheduled day | Fixed amount |
| 2. Evelyn-Veere Patent No. 4,176,395 and 5,229,937 | Fixed | Next scheduled day | At least partially based on accumulated ETo |
| 3. Hopkins Patent No. 5,097,861 | Fixed (Days other than non-watering days) | Next scheduled day that isn't a non-watering day | At least partially based on accumulated ETo |
| 4. Marian Patent No. 5,208,855 | Fixed | Next scheduled day | At least partially based on accumulated ETo |
| 5. Miller Patent No. 5,479,339 | Fixed | Next scheduled day | At least partially based on accumulated ETo |
| 6. Oliver Patent No. 5,696,671 and 5,870,302 | Varies | Irrigation deficiency level | Amount necessary to achieve full field capacity and past and forecast meteorological data |

Figure 1 Prior Art

ETo Data and Irrigation Application Data in Inches for January 1-15, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| A | 0.10 | 0.13 | 0.13 | 0.11 | 0.09 | 0.09 | 0.08 | 0.14 | 0.11 | 0.10 | 0.08 | 0.07 | 0.08 | 0.12 | 0.10 |
| B |  | 0.23 |  | 0.24 |  |  | 0.26 |  | 0.25 |  |  | 0.25 |  | 0.20 |  |

ETo Data and Irrigation Application Data in Inches for March 16-30, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| C | 0.10 | 0.13 | 0.16 | 0.18 | 0.09 | 0.17 | 0.17 | 0.08 | 0.15 | 0.09 | 0.14 | 0.05 | 0.16 | 0.19 | 0.13 |
| D |  | 0.26 |  | 0.34 |  | 0.26 |  | 0.25 |  | 0.24 |  | 0.19 |  | 0.35 |  |

ETo Data and Irrigation Application Data in Inches for July 1-15, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| E | 0.24 | 0.23 | 0.21 | 0.23 | 0.28 | 0.27 | 0.23 | 0.04 | 0.24 | 0.27 | 0.27 | 0.29 | 0.28 | 0.27 | 0.25 |
| F | 0.24 | 0.23 | 0.21 | 0.23 | 0.28 | 0.27 | 0.23 |  | 0.28 | 0.27 | 0.27 | 0.29 | 0.28 | 0.27 | 0.25 |

Figure 5

ETo Data and Irrigation Application Data Converted to Run-Time Minutes for January 1-15, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| G | 6 | 7 | 7 | 6 | 5 | 5 | 4 | 8 | 6 | 6 | 4 | 4 | 4 | 7 | 6 |
| H |   | 13 |   | 13 |   |   | 14 |   | 14 |   |   | 14 |   |   | 17 |

ETo Data and Irrigation Application Data Converted to Run-Time Minutes for March 16-30, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| I | 6 | 7 | 9 | 10 | 5 | 9 | 9 | 4 | 8 | 5 | 8 | 3 | 9 | 10 | 7 |
| J |   | 13 |   | 19 |   | 14 |   | 13 |   | 13 |   | 11 |   | 19 | 7 |

ETo Data and Irrigation Application Data Converted to Run-Time Minutes for July 1-15, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| K | 13 | 13 | 12 | 13 | 15 | 15 | 13 | 2 | 13 | 15 | 15 | 16 | 15 | 15 | 14 |
| L | 13 | 13 | 12 | 13 | 15 | 15 | 13 |   | 15 | 15 | 15 | 16 | 15 | 15 | 14 |

Figure 6

ETo Data and Irrigation Application Data in Inches for January 1-15, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| M | 0.10 | 0.13 | 0.13 | 0.11 | 0.09 | 0.09 | 0.08 | 0.14 | 0.11 | 0.10 | 0.08 | 0.07 | 0.08 | 0.12 | 0.10 |
| N |  |  | 0.25 |  | 0.25 |  |  | 0.25 |  | 0.25 |  |  | 0.25 |  | 0.25 |

ETo Data and Irrigation Application Data in Inches for March 16-30, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| O | 0.10 | 0.13 | 0.16 | 0.18 | 0.09 | 0.17 | 0.17 | 0.08 | 0.15 | 0.09 | 0.14 | 0.05 | 0.16 | 0.19 | 0.13 |
| P |  |  | 0.25 | 0.25 |  | 0.25 | 0.25 |  |  | 0.25 |  | 0.25 |  | 0.25 |  |

ETo Data and Irrigation Application Data in Inches for July 1-15, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Q | 0.24 | 0.23 | 0.21 | 0.23 | 0.28 | 0.27 | 0.23 | 0.04 | 0.24 | 0.27 | 0.27 | 0.29 | 0.28 | 0.27 | 0.25 |
| R |  | 0.30 | 0.25 | 0.25 | 0.25 | 0.30 | 0.25 |  | 0.25 | 0.25 | 0.30 | 0.30 | 0.25 | 0.30 | 0.25 |

Figure 7

ETo Data and Irrigation Application Data in Inches for January 1-15, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| S | 0.10 | 0.13 | 0.13 | 0.11 | 0.09 | 0.09 | 0.08 | 0.14 | 0.11 | 0.10 | 0.08 | 0.07 | 0.08 | 0.12 | 0.10 |
| T |  |  | 0.30 |  |  | 0.30 |  |  | 0.30 |  |  | 0.30 |  |  | 0.30 |

ETo Data and Irrigation Application Data in Inches for March 16-30, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| U | 0.10 | 0.13 | 0.16 | 0.18 | 0.09 | 0.17 | 0.17 | 0.08 | 0.15 | 0.09 | 0.14 | 0.05 | 0.16 | 0.19 | 0.13 |
| Y |  | 0.23 |  | 0.30 |  | 0.30 |  | 0.25 |  | 0.24 |  | 0.19 |  | 0.30 |  |

ETo Data and Irrigation Application Data in Inches for July 1-15, 1999 Riverside, CA

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| W | 0.24 | 0.23 | 0.21 | 0.23 | 0.28 | 0.27 | 0.23 | 0.04 | 0.24 | 0.27 | 0.27 | 0.29 | 0.28 | 0.27 | 0.25 |
| X | 0.24 | 0.23 | 0.21 | 0.23 | 0.28 | 0.27 | 0.23 | 0.04 | 0.24 | 0.27 | 0.27 | 0.29 | 0.28 | 0.27 | 0.25 |

Figure 8

AUTOMATIC IRRIGATION FREQUENCY ADJUSTMENT FOR DEEP WATERING

This application is a continuation in part of U.S. patent application Ser. No. 09/478,108 filed on Jan. 4, 2000.

FIELD OF THE INVENTION

The field of the invention is irrigation controllers.

BACKGROUND OF THE INVENTION

Many irrigation systems have been developed that automatically control the application of water to landscapes. These irrigation systems can range from simple systems that vary irrigation on a timed control basis, to very complex systems that vary irrigation based on climatic, geographic, and seasonal conditions. The complex systems can rely on various sources for data, including sensors and other devices that generate data locally, as well as governmental or commercial providers of information.

The watering intensity applied to a lawn, garden, farm, or any other application can be thought of as involving two components: (1) the cycle amount applied during a given application; and (2) the frequency of the application cycle. If, for example, a homeowner applies 0.3 inches of water to his lawn, twice a week, then the cycle amount of water is 0.3 inches, and the frequency is twice a week.

Relatively simplistic irrigation systems require manual changing of both the cycle amount and the frequency (See FIG. 1, item 1). For example, in the late Spring, a user having a standard irrigation system as in item 1 generally needs to increase both cycle amount and frequency relative to the Winter months. The user may make one or more additional increases during the Summer, and then decrease cycle amount and frequency during the Fall when it becomes cooler and the vegetation does not require so much watering. Unfortunately, these relatively infrequent seasonal modifications are typically insufficient to achieve efficient watering.

More complex controllers are known that make relatively frequent automatic compensations for environmental conditions. Exemplary systems that use evapotranspiration data (ETo data), for example, are discussed in U.S. Pat. No. 5,479,339 issued December, 1995, to Miller, U.S. Pat. No. 5,097,861 issued March 1992 to Hopkins, et al., U.S. Pat. No. 4,176,395 issued November 1979 and U.S. Pat. No. 5,229,937 issued July 1993 both to Evelyn-Veere, U.S. Pat. No. 5,208,855, issued May 1993, to Marian, and U.S. Pat. No. 5,696,671, issued December 1997, and U.S. Pat. No. 5,870,302, issued February 1999, both to Oliver. Other systems utilize temperature or soil moisture sensors.

Regardless of the mechanism(s) used to determine changes in environmental conditions, however, each of the known systems except U.S. Pat. Nos. 5,696,671 and 5,870,302 is directed to replacement of moisture lost due to evapotranspiration between the currently scheduled watering and the last previous watering. Thus, if the irrigation system is set to water daily, and the evapotranspiration on the previous Summer day was 0.25 inches, then the following day the irrigation system would apply 0.25 inches of water. If the system were set for every other day watering, then the next watering would apply 0.50 inches of water.

Items 2, 3, 4, and 5 of FIG. 1 summarize prior art irrigation systems in which the watering schedule and/or amount are partly derived from ETo data, such that the amount applied is that estimated to have been lost due to evapotranspiration. Even so, the irrigation frequency is similar to a standard irrigation system in that a day schedule is manually entered, and the irrigation applications are executed on one or more of those days (e.g., Mon-Wed-Fri, or Tue-Thu). The automatic features are that (a) rain days can automatically be skipped through use of a rain sensor, (b) the cycle amount varies according to the accumulated evapotranspiration loss, and (c) the irrigation applications may be split into two or more watering intervals to avoid excessive runoff.

It is not, however, always advantageous to apply the amount estimated to have been lost to evapotranspiration. For example, if the systems described above were to operate in late Fall when the evapotranspiration is perhaps only 0.06 inches per day, the system would try to apply only 0.06 inches on a daily watering schedule. Applying such an amount would be entirely impractical, and even if it could be accomplished, such shallow watering is bad for most crops. In the past, the shallow watering problem has usually been resolved by manually reducing the frequency by limiting the day schedule. For example, instead of watering 0.06 inches seven days a week, the schedule could be limited to one day a week, which would provide 0.42 inches of water on that one day. Such modifications to the day schedule can provide sufficiently deep watering, but is only effective where the user makes the required modifications.

Problems arise, for example, when a user fails to sufficiently alter the day schedule to accommodate weather changes. Such failure could occur because of user neglect or lack of training, because of extraordinarily hot or cold weather, or for other reasons. Whatever the reason, the known systems except U.S. Pat. Nos. 5,696,671 and 5,870,302 operate during such periods by watering excessively small amounts too frequently, or excessively large amounts too infrequently. Both conditions can cause serious damage to grass or other crops, or at least result in significantly suboptimal growth.

U.S. Pat. No. 5,870,302, summarized as item 6 of FIG. 1, addresses these problems by automatically varying the irrigation watering frequency. There, soil moisture is detected or estimated, and irrigation is commenced at the next available scheduled time slot whenever the moisture level is deemed to Fall below a threshold deficiency level. The cycle amount is calculated as being that amount of water necessary to raise the soil moisture back up to full field capacity Unfortunately, determinations of the threshold deficiency level and the cycle amount can be exceedingly complex. The threshold deficiency level, for example, is based on several factors including ETo, and is necessarily specific for each irrigated site. The cycle amount is also based upon several factors, including ETo, sensor data, and possibly forecasted weather data. The complexity of these calculations is such that once the irrigation deficiency and full field capacity levels are determined for a site, they are fixed, and future irrigation applications are based on those fixed values. Thus, devices and methods according to the '302 patent have limited applicability, and are mostly suitable for large irrigated sites, or situations in which a central computer is used to control multiple irrigation sites.

Thus, there is still a need for systems and methods that automatically execute irrigation applications to achieve deep watering at an irrigated site, that vary the deep watering parameters to meet seasonal changes, environmental changes, crop maturity changes and other yearly changes to optimize the efficient irrigation of the plants, and that can be used cost effectively to irrigate residential and small commercial sites.

SUMMARY OF THE INVENTION

The present invention provides systems and methods in which a microprocessor is programmed to (a) calculate an accumulated watering need for an irrigation zone, and (b) control irrigation to the zone using an automatically varied cycle amount that falls between a user controllable maximum threshold and a user controllable minimum threshold.

The cycle amount is preferably at least partly derived from ETo data. The ETo data may include potential ETo data, estimated ETo data, or historical ETo data.

The minimum threshold preferably varies during a period of 12 consecutive months. Alternatively, the minimum threshold may vary as a function of time of year, as a function of crop maturity or as a function of any other suitable factor where it would be advantageous to set a minimum threshold.

In a preferred embodiment the cycle amount substantially equals an accumulated ETo value(s) at least once during a calendar year. Furthermore, it is contemplated that the cycle amount will substantially equal the maximum threshold at least once during a calendar year.

Additionally, the microprocessor may be programmed to control the irrigation to the zone using an automatically varied day schedule. The automatically varied day schedule may comprise an adjustment from daily to every other day irrigation frequencies. Alternatively, the automatically varied day schedule may comprise an adjustment from every other day to weekly irrigation frequencies or to some other suitable frequency.

Various objects, features, aspects, and advantages of the present invention will become more apparent from the following detailed description that describes a preferred embodiment of the invention, along with the accompanying drawings in which like numerals represent like components.

BRIEF DESCRIPTION OF THE DRAWINGS

FIG. 1 is a chart comparing prior art irrigation systems with respect to irrigation frequency, irrigation application triggering mechanisms, and quantity of water applied during each irrigation application.

FIG. 5 is data that illustrates one method of automatically adjusting the frequency of irrigation applications.

FIG. 6 is data that illustrates the same method of automatically adjusting the frequency of irrigation applications as in FIG. 5 but the ETo data and irrigation applications are given in duration minutes rather than in inches of water applied.

FIG. 7 is data that illustrates an alternative method of automatically adjusting the frequency of irrigation applications.

FIG. 8 is data that illustrates a second alternative method of automatically adjusting the frequency of irrigation applications.

DETAILED DESCRIPTION

Figure 2:
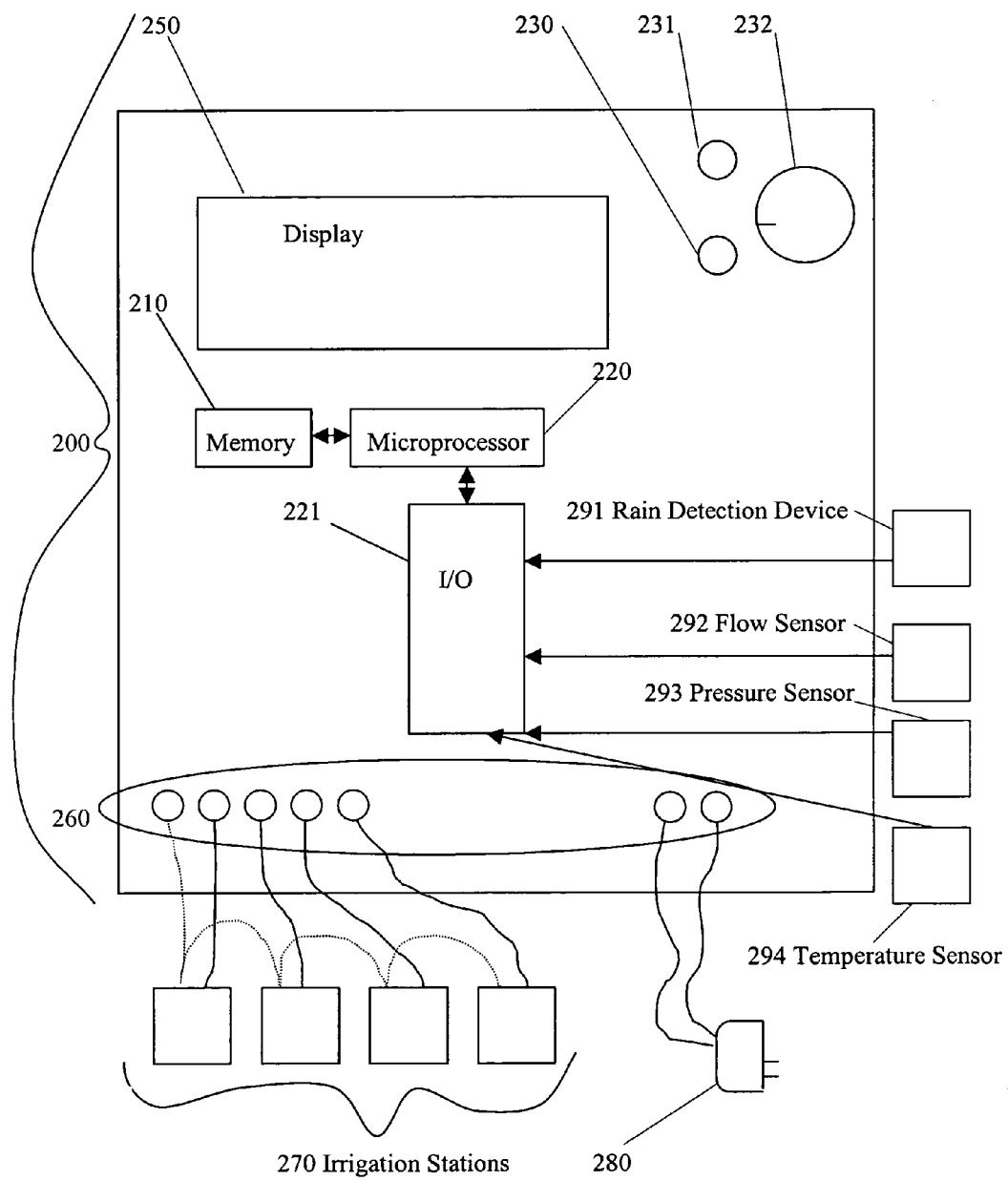
FIG. 2 is a schematic of an irrigation controller according to an aspect of the present invention.

Preferably the microprocessor 220 is disposed in an irrigation controller 200, FIG. 2. The irrigation controller 200 generally includes a microprocessor 220, an on-board memory 210, manual input devices 230 through 232 (buttons and/or knobs), an input/output (I/O) circuitry 221 connected in a conventional manner, a display screen 250, electrical connectors 260 which are connected to a plurality of irrigation stations 270 and a power supply 280, a rain detection device 291, a flow sensor 292, a pressure sensor 293 and a temperature sensor 294. Each of these components by itself is well known in the electronic industry, with the exception of the programming of the microprocessor in accordance with the functionality set forth herein. There are hundreds of suitable chips that can be used for this purpose. At the present, experimental versions have been made using a generic Intel 80C54 chip, and it is contemplated that such a chip would be satisfactory for production models.

In a preferred embodiment of the present invention the controller has one or more common communication internal bus(es). The bus can use a common or custom protocol to communicate between devices. There are several suitable communication protocols, which can be used for this purpose. At present, experimental versions have been made using an I2C serial data communication, and it is contemplated that this communication method would be satisfactory for production models. This bus is used for internal data transfer to and from the EEPROM memory, and is used for communication with peripheral devices and measurement equipment including but not limited to water flow sensors, water pressure sensors, and temperature sensors.

Figure 3:
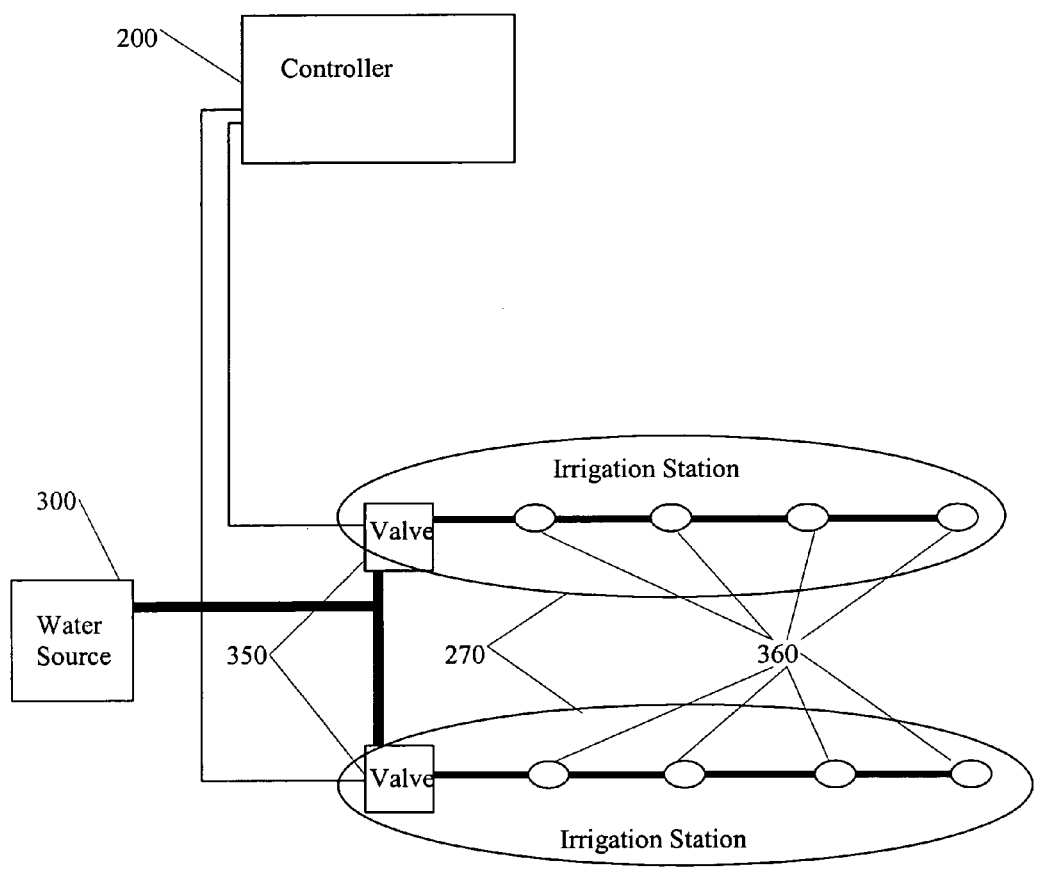
FIG. 3 is a block diagram of an irrigation system according to an aspect of the present invention.

In FIG. 3 a single irrigation controller 200 operates two irrigation stations 270. It will be understood that these stations 270 are indicative of any two or more irrigation stations, and are not to be interpreted as limiting the number or configuration of irrigation stations. It is contemplated that the irrigation stations may be part of an underground installed irrigation system, such as those used on residential sites, commercial sites, golf courses, public parks, and so forth. Additionally the irrigation stations may be part of center pivot systems, wheel type systems, solid set systems, or any other irrigation system used in the irrigating of plants. Structure and operation of the irrigation controller is preferably as described elsewhere herein except as to the adjustment of the irrigation application according to the condition of the plants being irrigated. Among other things, the irrigation controller 200 operates solenoids (not shown) that open the station valves 350 to allow irrigation water from the water source 300 to be distributed to the various irrigation stations 270 and thereby irrigate the landscape through one or more (four are shown for each irrigation station but it may be any number) irrigation sprinkler heads 360.

Figure 4:
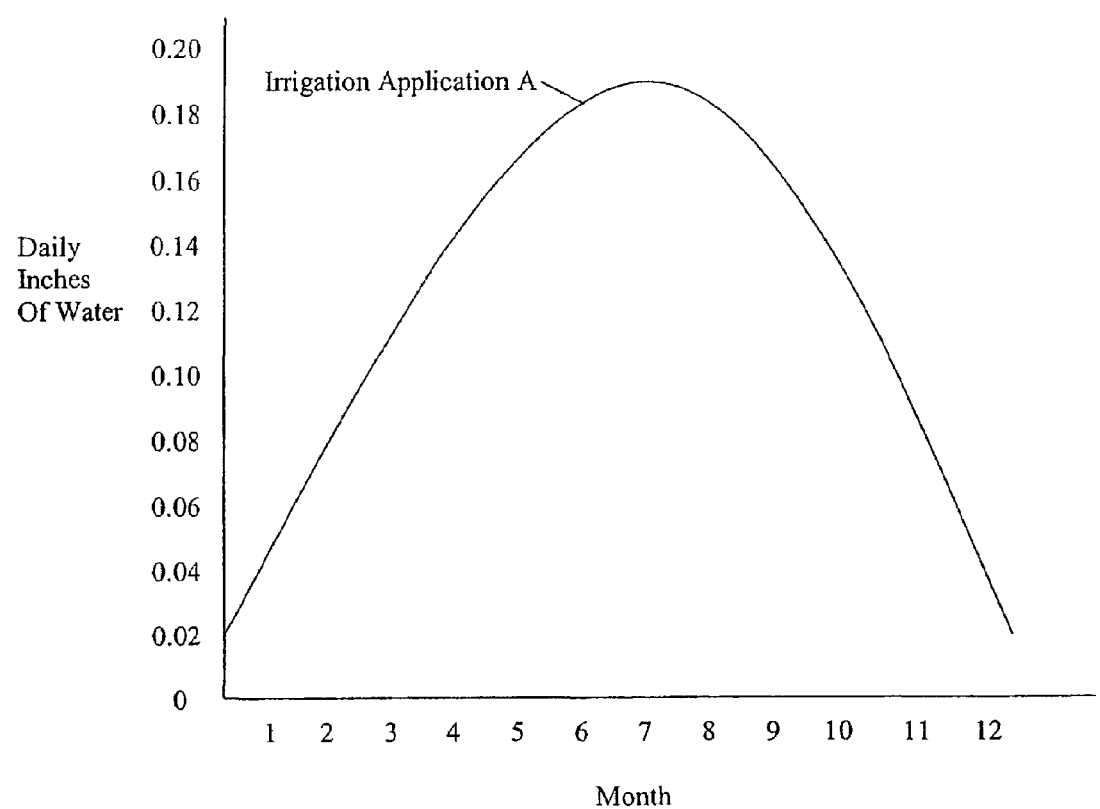
FIG. 4 is a graphical representation of an example of the daily irrigation applications that are executed by an irrigation controller to meet the daily water requirements of plants.

It is contemplated that when the irrigation controller is initially installed, an initial irrigation schedule will be programmed into the controller and stored in the memory. For example, if the irrigated site is a lawn and the time of year is Summer, the initial irrigation schedule may provide that each station apply a cycle amount of 0.19 inches of water with a frequency of seven days a week. During the ensuing year, the system automatically modifies the cycle amounts to provide the average cycle amounts depicted in FIG. 4, Irrigation Application A. From time to time manual changes can also be made to fine-tune the schedule, which would alter the height or shape of the curve.

Irrigation Application A is preferably at least partly derived from ETo data. ETo data is thought to closely approximate the water needs of the plants with a minimum waste of water. The ETo value(s) used may advantageously comprise current ETo (i.e., within the last week, three days, or most preferably within the last 24 hours). The current ETo may be a potential ETo value that is calculated from the four weather factors; solar radiation, temperature, wind and relative humidity. Alternatively, the current ETo may be an estimated ETo value (as for example that described in pending U.S. patent application Ser. No. PCT/US00/18705) based upon a regression model using one or more of the factors used in calculating potential ETo. The ETo may also comprise an historical ETo value (as for example that described in pending U.S. patent application Ser. No. PCT/US00/40685).

Irrigation Application A is preferably at least partly derived from ETo data. ETo data is thought to closely approximate the water needs of the plants with a minimum waste of water. The ETo value(s) used may advantageously comprise current ETo (i.e., within the last week, three days, or most preferably within the last 24 hours). The current ETo may be a potential ETo value that is calculated from the four weather factors; solar radiation, temperature, wind and relative humidity. Alternatively, the current ETo may be an estimated ETo value (as for example that described in pending U.S. patent application Ser. No. 10/009,867) based upon a regression model using one or more of the factors used in calculating potential ETo. The ETo may also comprise an historical ETo value.

As used herein, the term "user controllable . . . threshold" means that the user can, directly or indirectly, set the threshold. For example, it is contemplated that a user can set a user controllable minimum threshold to be 0.25 inches of water, 0.35 inches of water, or some other minimum value directly, by entering such numbers into an interface. The same effect could be achieved indirectly, by providing data from which the controller (or some other device) would calculate the threshold. Of course, the value would advantageously be set to some value greater than zero because otherwise the minimum would not function to improve the depth of watering. It should also be apparent that user controllable thresholds can be set in any appropriate measure, including inches (or other linear units such as millimeters or centimeters), minutes (or other time units such as seconds or hours), and gallons (or other volume measurements such as liters, acre-inches), and so forth. Those skilled in the art will immediately recognize that these different measurements and units are interchangeable for irrigation systems.

The automatic adjustment of the frequency of irrigation applications, to maintain a cycle amount above a user controllable minimum threshold and below a user controllable maximum threshold may be accomplished by various methods. The present invention discusses three methods that when used individually or in combination will generally maintain the cycle amount above a user controllable minimum threshold and below a user controllable maximum threshold. They are automatic execution of irrigation applications when a minimum threshold irrigation value is exceeded; automatic execution of irrigation applications when a maximum threshold irrigation value is attained; and automatic specification of days when irrigation applications will be made.

Referring to FIG. 5, listed in the tables are ETo values from a weather station in Riverside, Calif. In a preferred embodiment the irrigation application is partly derived from ETo data. Additionally, other factors, such as rainfall, crop coefficients, irrigation efficiencies and so forth are advantageously considered in arriving at the amount of water to be applied during each irrigation application. However, in this example and also in discussions concerning FIGS. 6, 7 and 8, it is assumed that the water applied during each irrigation application is based entirely on the ETo data from the Tables and does not take into consideration the other factors listed in the previous sentence.

FIG. 5 illustrates automatic execution of irrigation applications when a minimum threshold irrigation value is exceeded. The microprocessor (See FIG. 1, 220) is programmed to initiate execution of an irrigation application only when a minimum threshold irrigation value is exceeded. Preferably the minimum threshold irrigation value is minimum inches of water that need to be applied prior to execution of an irrigation application. Alternatively, the minimum threshold irrigation value may be a minimum duration of time such as minutes that the irrigation system will be irrigating each zone (See FIG. 6). Furthermore, if a flow meter was attached to the irrigation system, the minimum threshold irrigation value may be in minimum gallons of water that will need to be applied prior to execution of an irrigation application. The minimum threshold irrigation value and maximum threshold irrigation value (FIG. 7) may be in any terms that are suitable to indicate a minimum or maximum threshold irrigation value as related to a cycle amount of water that is applied.

In the illustration in FIG. 5, the minimum threshold irrigation value was set at 0.19 inches of water for November, December, January and February because there will generally not be rapid loss of water due to evapotranspiration. Additionally, the grasses will not be growing as actively during the Winter as during the Summer. Referring to the ETo data for Jan. 1–15, 1999 in row A, the first day the ETo value was 0.10 inches and therefore no irrigation application would be executed on day 1 since 0.10 inches did not exceed the 0.19 inch minimum threshold irrigation value. The microprocessor (See FIG. 1, 220) will be programmed to accumulate the daily ETo values until the next irrigation application is executed by the irrigation controller. On day 2 the ETo value was 0.13 inches and the accumulation amount for the two days would be 0.23 inches. Since 0.23 inches exceeds the threshold irrigation value of 0.19 inches, a cycle amount of 0.23 inches would be applied on day 2 as indicated in row B. Rows B, D, and F indicate the frequency of irrigation applications executed by the irrigation controller and the cycle amount of water applied. The frequency of the irrigation applications is dictated by the minimum threshold irrigation value and on days 4, 7, 9, 12, and 14 the accumulated ETo exceeds the threshold irrigation value of 0.19 inches, therefore, an irrigation application would be executed by the irrigation controller on each of these days.

The second set of data in FIG. 5 is ETo data and irrigation application data for Mar. 16–30, 1999. The minimum threshold irrigation value was set at 0.17 inches for March, April, September and October. The reason for lowering the minimum threshold limit is because evapotranspiration will be more rapid during the Spring and Fall months than during the Winter months. If the minimum threshold irrigation level was set too high during rapid evapotranspiration conditions, a day could be skipped and by the time the next irrigation application was applied the soil moisture could be at a level that would be detrimental to plant growth. Additionally, the plants are growing more actively during the Spring and Fall than during the Winter. There are many factors that may be taken into consideration when setting the minimum threshold irrigation values during the year including location of the irrigation site, season of the year, crop maturity, topography, soil characteristics, and so forth. The thresholds used in this example and the other examples illustrated in FIGS. 6, 7, and 8 are just examples and more refinements would likely be made before threshold levels are set for the different locations, for the different crops and for the different times during the year. However, the factors used in setting the minimum and maximum threshold levels during the year would be uniform for certain geographic areas, crops, etc. to permit the use of irrigation controllers that achieve deep watering according to the present invention to be purchased by residential and small business irrigation users.

The weather in March is very likely warmer than in January and therefore the ETo values are higher. However, the frequency in irrigation applications is only slightly greater than in January but the cycle amount applied per application is higher in March than in January, FIG. 5.

The third set of data in FIG. 5 is ETo data and irrigation application data for Jul. 1–15, 1999. The minimum threshold irrigation value was set at 0.15 inches for the months of May, June, July and August for similar reasons as discussed above for March when compared to January's minimum threshold irrigation level. This is most likely the warmest time during the year and the evapotranspiration would be the highest. The ETo values are all above the threshold irrigation value of 0.15 inches except for one day and therefore irrigation applications are executed every day except for the one day.

The method illustrated in FIG. 5, of automatically adjusting the frequency of irrigation applications based on exceeding a minimum threshold irrigation value, resulted in applications of cycle amounts of 0.19 inches of water or higher. Therefore, deep watering that allows for good root growth will have occurred with all of the irrigation applications.

Although, in the above example, a maximum amount of water to be applied during any one irrigation wasn't included, it is contemplated that this would also be programmed into the microprocessor. This would prevent excessive amounts of water being applied during any one irrigation application. Any accumulated ETo value(s) above the maximum level of water to be applied that was not applied, would be applied during future irrigation applications. This maximum amount of water to be applied, during any one irrigation application, would vary during the year (See description in FIG. 7).

FIG. 6 is similar to FIG. 5 in that it illustrates automatic execution of irrigation applications when a minimum threshold irrigation value is exceeded except that the threshold value is in duration of time that the irrigation application will be irrigating rather than the inches of water that are applied during an irrigation application. In this example the minimum threshold irrigation value for the Winter months was set at 70% of the Summer run-time minutes. The determination of the minimum threshold irrigation value based on duration of time that the irrigation application will be irrigating can be determined by any method. In this example, by using 70% of Summer run-time minutes there will be a minimum cycle amount of 0.20 inches of water applied during each irrigation. However, the percentage could be less than or more than 70%. In this example, the Summer run-time minutes were 16 minutes or the minutes required to apply a cycle amount of 0.29 inches of water, which was the highest amount lost through evapotranspiration during the Summer. The application rate will vary with each irrigation system and for each irrigation zone within each irrigation system. If the minimum threshold irrigation value is set at 70% of the Summer run-time minutes and the Summer run-time minutes are 16 minutes then the minimum threshold irrigation value is 11 minutes.

Referring to FIG. 6, row G, on the first day the run-time was 6 minutes and therefore no irrigation application would be executed on day 1 since 6 minutes did not exceed the 11 minute minimum threshold irrigation value. If no irrigation application is executed the run-time minutes for that day are added to the next days run-time minutes. On day 2 the run-time was 7 minutes and the accumulation amount for the two days would be 13 minutes. Since 13 minutes exceeds the minimum threshold irrigation value of 11 minutes an irrigation application would be executed on day 2 as indicated in row H. Rows H, J, and L indicate the frequency of irrigation applications executed by the irrigation controller and the cycle amount in minutes of run-time of each application. On days 4, 7, 9, 12, and 15 the accumulated run-times exceed the minimum threshold irrigation value of 11 minutes, therefore an irrigation application would be executed by the irrigation controller on each of these days.

The second set of data, in FIG. 6, is run-time minutes for Mar. 16–30, 1999. The minimum irrigation threshold value is set at 62.5% of the Summer run time minutes or the ETo values have to be greater than 10 minutes (11 minutes or higher) for an irrigation application to be executed. As mentioned above, the frequency in irrigation applications is only slightly greater than in January. However, in January there was no irrigation applications that exceeded a 17 minute duration whereas in March there are two irrigation applications that exceed a 17 minute duration.

The third set of data, in FIG. 6, is run-time minutes for Jul. 1–15, 1999. The minimum irrigation threshold value is set at 56% of the Summer run time minutes or the ETo values have to be greater than 9 minutes (10 minutes or higher) for an irrigation application to be executed. The run-time minutes are all above the threshold irrigation value of 10 minutes except for one day and therefore irrigation applications are executed every day except for the one day.

FIG. 7 illustrates automatic execution of irrigation applications when a maximum threshold irrigation value is attained. The microprocessor (See FIG. 1, 220) is programmed to initiate execution of an irrigation application only when a maximum threshold irrigation value is attained. Preferably the maximum threshold irrigation value is in inches of water to be applied during an irrigation application. Alternatively, the maximum threshold irrigation value may be in terms of a duration of time that the irrigation application will be irrigating. In the illustration in FIG. 7 the initial maximum threshold irrigation value was set at 0.25 inches of water. Additionally, if the accumulated ETo value(s) are more than 0.15 inches above 0.25 inches then the threshold level is raised to 0.30 inches. This prevents the carry over of high amounts of accumulated ETo value(s) and the likelihood that some of the accumulated ETo value(s) would not be applied at all. It is contemplated that the cycle amounts will be equal to the maximum threshold irrigation value of either 0.25 inches or 0.3 inches.

FIG. 7, in row M on the first day the ETo value was 0.10 inches and therefore no irrigation application would be applied on day 1 since 0.10 did not attain the 0.25 inch maximum threshold irrigation value. If no irrigation application is executed the ETo value is accumulate and added to the next days ETo value. On day 2 the ETo value was 0.13 inches and the accumulation amount for the two days would be 0.23 inches. Since 0.23 inches still does not attain the 0.25 inch maximum threshold irrigation value there was no execution of an irrigation application on day 2. On day 3, the ETo value was 0.13 inches, the accumulation amount for the three days is 0.36 inches and the maximum threshold irrigation value of 0.25 inches has been attained. Therefore, an irrigation application would be executed on day 3 as indicated in row N. Rows N, P, and R indicate the frequency of irrigation applications that are executed by the irrigation controller and the cycle amount of water applied. Preferably, as mentioned above, the cycle amount is equal to the threshold irrigation value or 0.25 inches.

The accumulated amount for the first three days was 0.36 inches but a cycle amount of only 0.25 inches of water was applied on day three, therefore 0.11 inches is carried over and added to the cycle amount that will be applied during the next irrigation application. The ETo value on the fourth day is 0.11 inches plus the 0.11 inches that was carried over provides an accumulated amount of 0.22 inches which is less than the maximum threshold irrigation value of 0.25 inches therefore no irrigation application would be executed on day 4. The ETo value on day 5 is 0.9 inches, which added to 0.22 inches gives an accumulated amount of 0.31 inches and therefore the maximum threshold irrigation value of 0.25 inches is attained and an irrigation application will be executed on day 5. The cycle amount will again be 0.25 inches of water and there will be a carry over of 0.06 inches. Using the same procedure for the remaining 10 days, results in execution of irrigation applications of cycle amounts of 0.25 inches on day 8, 10, 13, and 15.

The same procedure in determining the application days and cycle amounts used above for January 1–15 was followed for determining the frequency and amounts of the irrigation applications for March 16–30 and July 1–15. However, during July 1–15, on some of the days the accumulated ETo value(s) exceeded the 0.25 inch threshold irrigation level by 0.15 inches or more and therefore on these days 0.30 inches of water was the maximum threshold irrigation level. On day 2, 6, 11, 12, and 14, a cycle amount of 0.30 inches of water was applied during the execution of the irrigation application. On the rest of the days, except day 8, a cycle amount of 0.25 inches of water was applied during the execution of the irrigation application. Therefore, with all irrigation applications that are based on when a maximum threshold irrigation value is attained, there will be cycle amounts of 0.25 inches or 0.30 inches of water applied, which will provide deep watering with very little potential of runoff.

The problem with setting a maximum threshold irrigation level is that, as was discussed earlier, sometimes days may be skipped when the maximum threshold irrigation level wasn't reached and if there is high evapotranspiration then low soil moisture levels might occur that could be detrimental to plant growth. Therefore, it is contemplated that with some locations, crops, and/or during certain seasons it would be advantageous to use one method instead of the other method. Additionally, as is discussed in greater detail later, it can be appreciated that it would be advantageous to combine procedures from the two methods in certain circumstances.

FIG. 8 illustrates automatic specification of days when irrigation applications will be executed by the irrigation controller (See FIG. 2, 200). Some irrigation users may prefer to have only certain days when irrigation will occur. The microprocessor 220 is preprogrammed with the days when the irrigation applications will be executed. Preferably this is based on historic ETo data. However, it may be based on historic irrigation data or other factors that would provide some indication of the water requirements of the plants during the year. An example of a basic preprogram that might be entered in the microprocessor is to set the irrigation controller to execute daily irrigation applications during the Summer, every other day irrigation applications during the late Fall and early Spring, and every third day irrigation applications during the Winter. It should be appreciated that the above listed irrigation application frequencies are very general and that in actual practice they would be refined based on the irrigation site location, crop, and other factors. After the irrigation application frequencies are programmed into the microprocessor 220, the microprocessor will automatically make the changes to the irrigation applications during the year.

The data in row S is ETo data for Jan. 1–15, 1999. As mentioned earlier, preferably the irrigation controller will execute irrigation applications every third day during the Winter. Therefore, adding the ETo values for the first three days of January results in a total accumulation of 0.36 inches. The executed irrigation applications could be set to apply the accumulated ETo value(s) or in this example a cycle amount of 0.36 inches of water. Alternatively, it would be advantageous if the irrigation application amounts would be set not to exceed some maximum amount, such as, a cycle amount of 0.30 inches of water per irrigation application. This would prevent applications of excessive amounts of water to the irrigated site during any irrigation application. Any accumulated ETo value(s) above the maximum watering amount will be applied during the next scheduled irrigation application. Therefore, a cycle amount of 0.30 inches of water will be applied during the execution of the irrigation application on the third day as indicated in row T. Rows T, Y, and X indicate the frequency of irrigation applications that are executed by the irrigation controller and the cycle amount of water applied. During days 4, 5, and 6 there will be an ETo accumulation of 0.29 inches plus a carry over of 0.06 inches for a total of 0.35 inches. Again a cycle amount of 0.30 inches would be executed on day 6. The same procedure would be followed for the rest of the January 1–15 day period. The result would be that in addition to days 3 and 6, irrigation applications of cycle amounts of 0.30 inches would be executed on days 9, 12 and 15.

Row Y illustrates the days and amounts of water that would be applied, if the frequency of irrigation applications were changed to every other day during early Spring irrigations for the period from Mar. 16–30, 1999. Again, accumulating the ETo values until an irrigation application is executed would result in irrigation applications of cycle amounts of 0.23, 0.30, 0.30, 0.25, 0.24, 0.19, and 0.30 inches for day 2, 4, 6, 8, 10, 12, and 14, respectively. By setting a maximum amount that will be applied during any one application the cycle amounts advantageously Fall between 0.19 and 0.30 inches.

The last set of rows in FIG. 8, W and Y, illustrate daily irrigation applications during the Summer or from Jul. 1–15, 1999. All of the daily irrigation applications involve irrigations of cycle amounts greater than 0.20 inches of water except for day 8 when only 0.04 inches of water would be applied.

As FIG. 8 illustrates, most of the irrigation applications involve cycle amounts above 0.19 inches when using the irrigation application frequencies as discussed above. This should generally provide for deep irrigation, which is conducive for good root development.

It is contemplated that a combination of two or more methods may be used to achieve deep watering without over watering. For example, specific days could be set for watering and a minimum threshold value could be set that the accumulated ETo value(s) have to exceed before watering will occur. The minimum threshold value would vary during the year. If the minimum threshold level isn't exceeded then the irrigation application won't occur until the next specified day and accumulation of the ETo values will continue to occur until the next irrigation application. Additionally, a maximum threshold value could be set that the irrigation applications will not exceed, with carryover of any excess water to the next specified day. This provides irrigation applications that occur only on specified days, irrigation application amounts that are never less than a set minimum threshold irrigation value, and irrigation application amounts that are never greater than a set maximum irrigation amount. As mentioned previously, the minimum and maximum threshold levels will vary during the year as a function of time of the year, crop maturity, and other factors.

Thus, specific embodiments and applications of methods and apparatus of the present invention have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A microprocessor programmed to (a) calculate an accumulated watering need for an irrigation zone, and (b) control irrigation to the zone using an automatically varied frequency of irrigation and an automatically varied cycle amount, wherein the cycle amount on watering days falls between a user controllable maximum threshold irrigation value, and a user controllable non-zero minimum threshold irrigation value, and wherein the user sets both the minimum threshold irrigation value and the maximum threshold irrigation value as a duration of time.

2. The microprocessor of claim 1, wherein the cycle amount is at least partly derived from ETo data.

3. The microprocessor of claim 2, wherein the ETo data comprises potential ETo data.

4. The microprocessor of claim 2, wherein the ETo data comprises estimated ETo data.

5. The microprocessor of claim 2, wherein the ETo data comprises historical ETo data.

6. The microprocessor of claim 1, wherein the minimum threshold irrigation value varies during a period of 12 consecutive months.

7. The microprocessor of claim 6, wherein the minimum threshold irrigation value varies as a function of time of year.

8. The microprocessor of claim 6, wherein the minimum threshold irrigation value varies as a function of crop maturity.

9. The microprocessor of claim 1, wherein the cycle amount substantially equals an accumulated ETo value(s) at least once during a calendar year.

10. The microprocessor of claim 1, wherein the cycle amount substantially equals the maximum threshold irrigation value at least once during a calendar year.

11. The microprocessor of claim 1 wherein the microprocessor is further programmed to control the irrigation to the zone using an automatically varied day schedule.

12. The microprocessor of claim 11, wherein the automatically varied day schedule comprises an adjustment from daily to every other day irrigation frequencies.

13. The microprocessor of claim 11, wherein the automatically varied day schedule comprises an adjustment from every other day to weekly irrigation frequencies.

* * * * *

UNITED STATES PATENT AND TRADEMARK OFFICE
CERTIFICATE OF CORRECTION

PATENT NO. : 7,096,094 B2 Page 1 of 1
APPLICATION NO. : 10/344013
DATED : August 22, 2006
INVENTOR(S) : John Addink It is certified that error appears in the above-identified patent and that said Letters Patent is hereby corrected as shown below:

On title page, item 76 Inventors
replace "John Addink and Kirk Buhler"
with --John Addink, Kirk Buhler and Tony Givargis--.

Signed and Sealed this

Thirty-first Day of October, 2006

JON W. DUDAS
*Director of the United States Patent and Trademark Office*